Jan. 11, 1927.

H. S. EARLE

ANIMAL TRAP

Filed March 9, 1925

1,613,652

Inventor
HORATIO S. EARLE
By Charles E. Wiener
Atty.

Patented Jan. 11, 1927.

1,613,652

UNITED STATES PATENT OFFICE.

HORATIO S. EARLE, OF DETROIT, MICHIGAN.

ANIMAL TRAP.

Application filed March 9, 1925. Serial No. 13,997.

This invention relates to animal traps and the object of the invention is to provide a trap arranged to prevent animals within the trap from escaping while other animals are entering the trap.

Another object of the invention is to provide a trap of cheap construction having a series of depending wire catcher bars rotatably supported on a rod, means being provided for holding the said catcher bars in an angular position.

Another object of the invention is to provide an animal trap having a perforated sheet metal body so that the trap may be immersed in the water to kill the animals caught therein, the body being provided with a handle for this purpose and to allow the trap to be easily carried.

Another object of the invention is to provide a trap which may be readily opened by turning the trap upside down.

These objects and the several novel features of the invention are hereinafter more fully described and claimed and the preferred form of construction by which these objects are attained is shown in the accompanying drawings in which—

Figure 1:
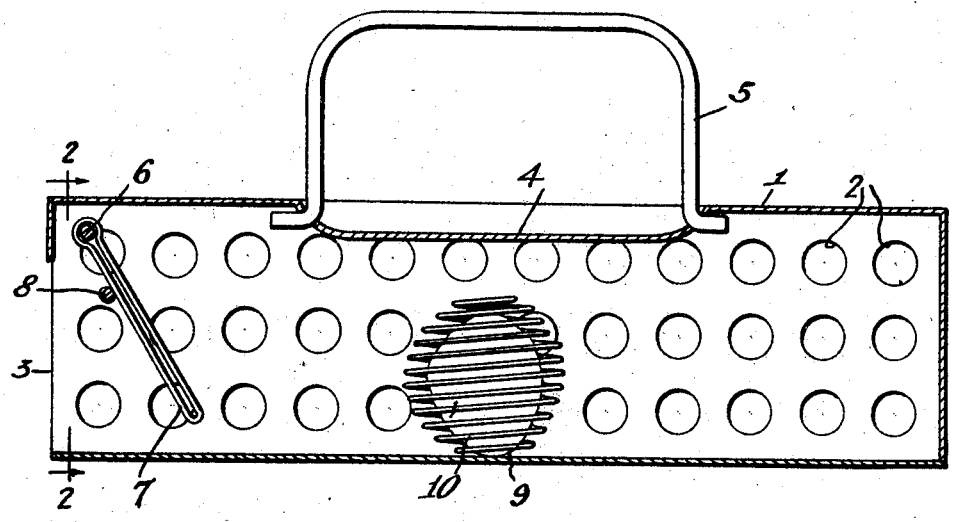
Fig. 1 is a longitudinal section through an animal trap embodying my invention.
Figure 2:
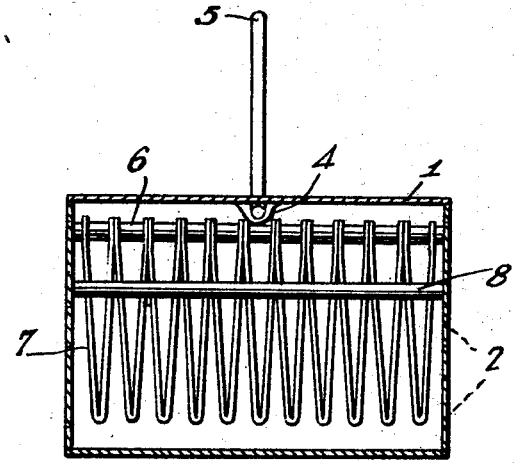
Fig. 2 is a section taken on line 2—2 of Fig. 1.

The trap comprises a rectangular sheet metal casing 1 provided with a series of apertures 2 in the opposite sides thereof and having an open end 3 as shown in Fig. 1. The casing 1 is provided with a depression 4 apertured at each end to receive the ends of a handle 5. A wire rod 6 as shown in Figs. 1 and 2 is secured at each end in the sides of the casing and a series of substantially V-shaped wire catcher bars are all turnable independently on the rod 6 and normally rest against the rod 8 secured at each end to the sides of the casing beneath the rod 6. This rod 8 holds the catcher bars in an angular position as will be readily understood from Fig. 1. As shown in Fig. 1 a bait holder is formed from a single piece of wire 9 which is wound spirally and is then stretched out endwise to form a sphere. The coils of the spiral 9 may be spread apart to allow the bait 10 to be positioned within the bait holder and the bait holder is then positioned within the rectangular casing 1. The bait holder is preferably of sufficient size so that it cannot be removed from the trap through the space beneath the catcher bars 7. When the animal enters the trap it raises only the catcher bars which are contacted by the animal's body and thus any animals already within the trap are prevented from escaping during the entrance of an animal from the outside. Should one of the animals within the trap attempt to escape beneath the catcher bars the ends of the catcher bars engage the animal's body and thus prevent escape of the animal. By means of the bait holder the bait cannot be eaten up and thus the bait remains to attract other animals even though there are several animals in the trap. By means of the handle 5 the trap may be immersed in water until the animals therein have been killed and the trap may then be turned upside down allowing the catcher bars to fall against the top of the trap at which time the trap may be readily emptied and upon again positioning the trap in the upright position and replacing the bait the trap is again ready for use. The trap is preferably made of rust-proof material and being made of sheet metal and wire is of very low manufacturing cost and is at the same time very efficient in operation.

Having thus fully described my invention, its utility and mode of operation, what I claim and desire to secure by Letters Patent of the United States is—

1. An animal trap comprising a rectangular sheet metal casing, a wall of which is provided with a plurality of apertures of a size sufficiently small as to prevent escape of the animal to be caught therein, the said casing providing a single hollow chamber free from interior obstruction, one end of the said casing having an opening of a size to permit ingress of an animal, a rod secured across the said open end at the top, a series of bars depending therefrom toward the bottom of the casing over the said opening, a second bar across the said opening near the top on which the bars rest and permitting movement of the bars inwardly only, said bars terminating short of the bottom of the casing, a bait holder formed of wire arranged in globular form adapted to freely move about the interior of the casing and being of sufficient size to prevent its movement from the casing when the bars are in normal position.

2. An animal trap comprising a sheet metal case forming a single interior chamber free from obstructions, a bait holding device of ball like form freely movable within the confines of the chamber, an opening in the said casing for ingress of an animal, catcher bars consisting of a series of members extending at an angle to the vertical over the said opening within the casing and freely movable toward the interior thereof, means preventing movement of the bars from normal position toward the exterior of the casing, the said bars being spaced apart and from the bottom of the casing a distance less than the size of the bait holder preventing its removal therefrom when the bars are in normal position.

In testimony whereof I sign this specification.

HORATIO S. EARLE.